United States Patent [19]

Tamura

[11] Patent Number: 5,422,064
[45] Date of Patent: Jun. 6, 1995

[54] METHOD FOR MANUFACTURING A DIAPHRAGM FOR A GASMETER

[75] Inventor: Seiji Tamura, Fukushima, Japan

[73] Assignee: Toyo Tire & Rubber Co., Ltd., Osaka, Japan

[21] Appl. No.: 221,559

[22] Filed: Apr. 1, 1994

Related U.S. Application Data

[63] Continuation of Ser. No. 864,362, Apr. 6, 1992, which is a continuation of Ser. No. 526,571, May 21, 1990.

[30] Foreign Application Priority Data

May 25, 1989 [JP] Japan ................... 1-132186
Sep. 11, 1989 [JP] Japan ................... 1-234857

[51] Int. Cl.⁶ ............................................. B29C 33/40
[52] U.S. Cl. ................................. 264/219; 264/231;
264/230; 264/324; 264/313; 425/325; 425/395
[58] Field of Search ............... 264/227, 313, 231, 325, 264/326; 425/395

[56] References Cited

U.S. PATENT DOCUMENTS

| | | | |
|---|---|---|---|
| 3,376,607 | 3/1968 | Brown | 425/416 |
| 3,971,840 | 7/1976 | Economy et al. | 264/231 |
| 4,024,623 | 5/1977 | Kun | 264/219 |
| 4,034,054 | 7/1977 | Sauer | 264/312 |
| 4,123,494 | 10/1978 | Eurand et al. | 264/313 |
| 4,214,030 | 7/1980 | Rakes et al. | 264/231 |
| 4,271,116 | 6/1981 | Jones | 264/313 |
| 4,315,523 | 2/1982 | Mahawili | 137/486 |
| 4,701,293 | 10/1987 | Mead | 264/325 |

FOREIGN PATENT DOCUMENTS

| | | |
|---|---|---|
| 45-5239 | 2/1970 | Japan . |
| 47-30891 | 12/1972 | Japan . |
| 59-177604 | 10/1984 | Japan . |
| 1218819 | 1/1971 | United Kingdom . |
| 2190656 | 11/1987 | United Kingdom . |

Primary Examiner—Patrick J. Ryan
Assistant Examiner—Merrick Dixon
Attorney, Agent, or Firm—Frishauf, Holtz, Goodman & Woodward

[57] ABSTRACT

This method for forming a measuring diaphragm which measures the volume of a passing gas with high accuracy and has a prolonged service life because the diaphragm moves completely in the same way to both sides of the measuring vessel in which it is fixed. The measuring diaphragm when produced in quantity has an undulating structure of high uniformity and variation in quality of the diaphragm is small. The method of preparation of the measuring diaphragm includes providing each of a pair of molds with a flat part at the center and providing a multiplicity of grooves and ribs at the periphery parallel to an edge of the central part; placing the grooves and ribs in such a way that the grooves of one mold fit the ribs of the other mold, such that the depth of a groove on a mold is larger than the height of a rib on the other mold which fits the groove; pressing an elastomer composite sheet material between the molds, such that one side of the pressed elastomer composite sheet material is pressed to the surface of the ribs of the mold and fixed there with tension and the other side of the elastomer composite sheet material is out in contact with the surface of the grooves of the mold; and then heating the elastomer composite sheet material to crosslink the elastomers composite sheet and to form a desired shape.

20 Claims, 7 Drawing Sheets

METHOD FOR MANUFACTURING A DIAPHRAGM FOR A GASMETER

This application is a Continuation of application Ser. No. 07/864,362, filed Apr. 6, 1992, now abandoned which is a Continuation application of Ser. No. 07/526,571 filed May 21, 1990 (now abandoned).

BACKGROUND OF THE INVENTION

1. Field of the Invention

The present invention relates to a method for manufacturing a measuring diaphragm for gasmeters. More particularly, the present invention relates to a method of preparation of gas diaphragms, wherein the gasmeter is conveniently utilized in household applications and has a high measurement accuracy.

2. Prior Art

A gasmeter which measures the accumulated volume of gas passing through the gasmeter by counting the number of movements of a measuring diaphragm in the instrument as shown in FIG. 1 through FIG. 4 has been known.

The gasmeter comprises a pair of measuring vessel and also a pair of measuring diaphragm. When the pressure of gas at the outlet of the vessel is decreased by the consumption of gas, additional gas is introduced to the vessel through the inlet by the pressure of the supply gas and the measuring diaphragm is pushed to a side. The accumulated volume of the passing gas through the instrument is measured by counting number of the movement of the measuring diaphragm.

The mechanism of the measurement is explained in more detail in the following. Valves A and A' equipped to the instrument open or close the inlets of gas by moving sideways in connection with the movements of the diaphragm. In the example shown in FIG. 1, the valve A opens an inlet B connected to the right side of the diaphragm in the right vessel C. The gas in the left side of the diaphragm in the vessel can go to the line of utilization through another inlet D, an outlet E, and a connection K. At this time, the other valve A' closes inlets B' and D' and an outlet E'.

Figure 1:
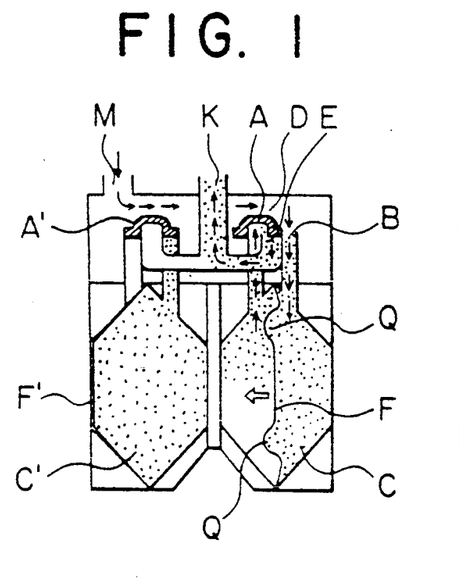
FIG. 1 through FIG. 4 shows an example of the mechanism of a gasmeter to which the present invention is applied.

When gas in the left side of the measuring diaphragm F in the measuring vessel C is consumed, the pressure of the gas is decreased and a stream of gas is introduced to the right side of the diaphragm, pushing the diaphragm toward the left wall of the vessel with the pressure of the supply gas.

The stream of the incoming gas continues to push the diaphragm toward the left wall. When the diaphragm moves to a position almost in contact with the wall, the gas in the right side of the diaphragm is utilized through the outlet E which is opened by the shift of the valve A and then through the connection K.

Figure 5:
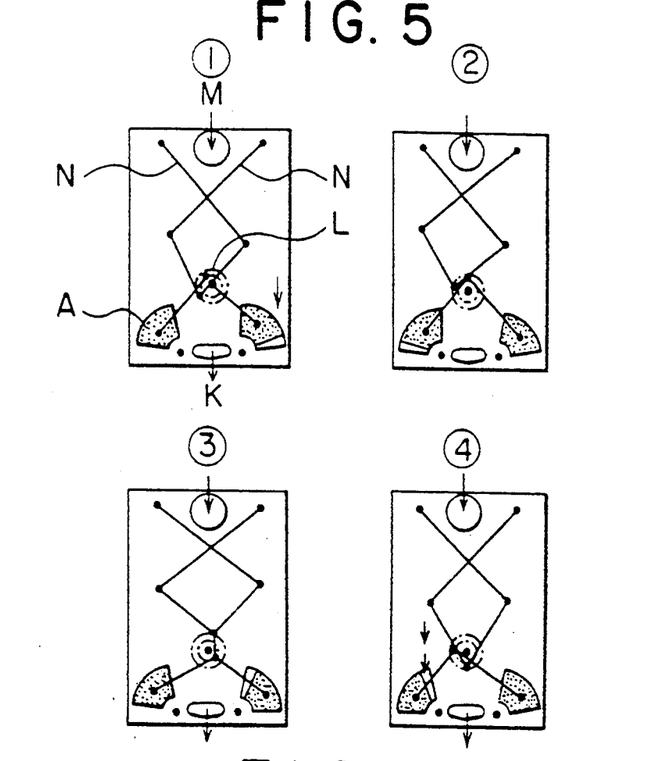
FIG. 5 shows the relationship between the function of valves and the movement of links which moves in connection with the movement of diaphragms.

The instrument has a cam L which rotates in connection with the two diaphragms F and F' as shown in FIG. 5. When the positions of valves A and A' are shifted from the positions shown in ① to the positions shown in ② automatically by the action of cam L, the connection in the gasmeter is changed to the one shown in FIG. 2. Thus, the gas in the left vessel is connected to the line of utilization and to the line of supply.

Figure 2:
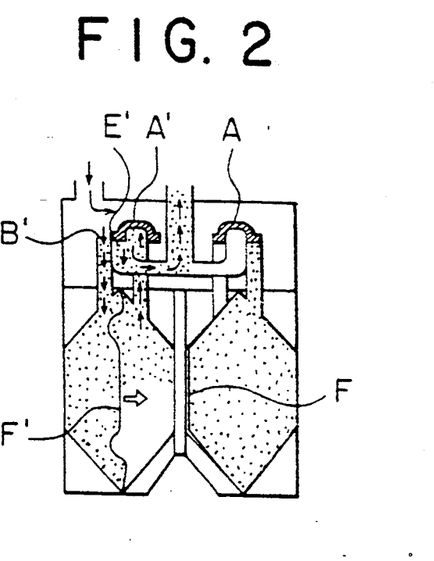

In the condition shown in FIG. 2, stream of gas is introduced into the vessel C' through the inlet B'. The gas newly introduced is accumulated in the left side of the measuring diaphragm F' and the gas previously accumulated in the right side of the diaphragm is discharged through the outlet E'.

Figure 3:
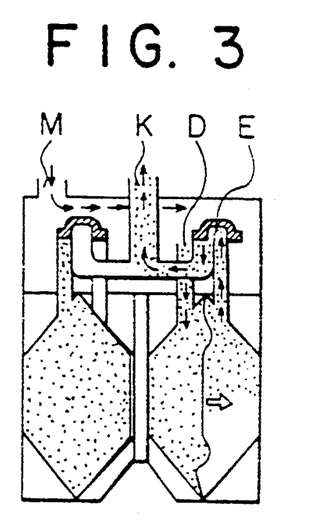
Figure 4:
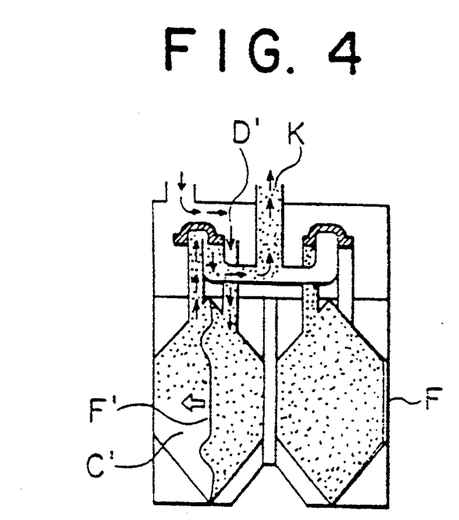

When the measuring diaphragm F' is pushed to the position almost in contact with the right wall of the vessel C', the positions of the valves A and A' are shifted from the positions shown in ② of FIG. 5 to the position shown in ③ of FIG. 5 automatically by the action of cam L. Thus, the condition of the vessel is changed to the one shown in FIG. 3, a stream of gas is introduced into the vessel C through the inlet D and pushes the diaphragm F toward the right wall this time and the gas accumulated in the vessel C during the process shown in FIG. 1 is discharged through the outlet E and the connection K. When the process shown in FIG. 3 is finished, the positions of the valves are shifted by the action of the cam L from the positions shown in ③ of FIG. 5 to the positions shown in ④ and the condition of the vessel is changed to the one shown in FIG. 4. A stream of gas is introduced in the right side of the diaphragm, the accumulated gas in the left side of the diaphragm is discharged and a cycle of the process is finished.

When the utilization of gas is continued, a stream of gas continues to flow into the gasmeter through repeating of the processes shown in FIG. 1 through FIG. 4. The number of the repeated movement of the measuring diaphragm during the process is counted by the number of rotation of cam L connected to the diaphragm or by any other appropriate methods and the total volume of the gas passed through the gasmeter is measured.

When the utilization of gas is stopped, the pressure of gas at the outlet is increased and the movement of the diaphragm stops when the pressure at both sides of the diaphragm comes to balance.

This type of gasmeter has been widely used because it is conveniently utilized to household applications and reliable with highest accuracy of the measurement.

A cycle of the movement of the valves A and A' is monitored through the rotation of cam L which is connected to two measuring diaphragms. The number of the movement of the diaphragms is counted by counting the number of rotation of the link with the use of an accumulating counter and the accumulated count gives the volume of the gas passed through the gasmeter by a suitable calculation.

Figure 6:
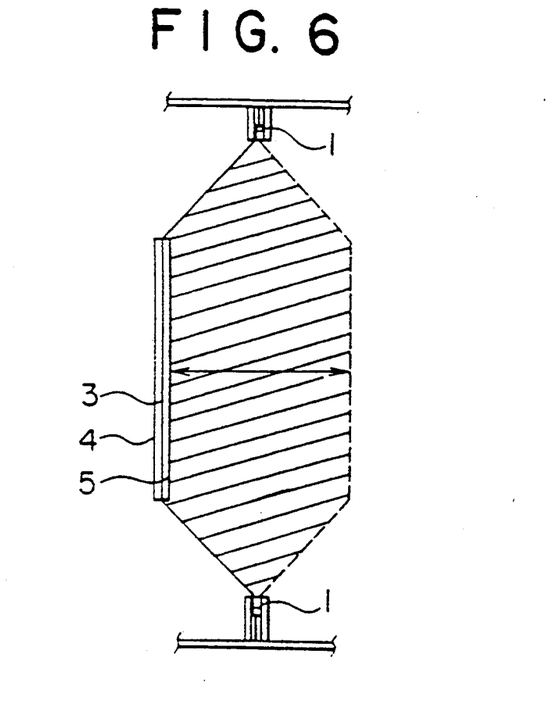
FIG. 6 shows a shape and the function of a diaphragm conventionally used in a gasmeter.

A measuring diaphragm utilized in a gasmeter of the type described here is, for example, a flexible diaphragm made of a sheet of a rubber-coated fabric having precise dimensions. The diaphragm is generally prepared to the same shape as the wall of the vessel as shown in FIG. 6.

The measuring diaphragm is shaped by using molds having a truncated cone shape or a truncated pyramid shape. A flat part is formed at the center and fixed to the shape by attaching two thin plates of a metal or a plastics in a sandwich structure. The periphery of the central flat part is made flexible. When the central flat part moves to the other side, the peripheral part is deformed to take an inversed shape and fits the wall of the vessel.

When, for example, the diaphragm is shaped to a truncated cone or pyramid to fit the left wall of the vessel, the diaphragm fits the wall well when it moves toward the left wall. However, when the diaphragm moves toward the right wall of the vessel, a loosely deformed shape Q is formed in the peripheral part of the diaphragm as shown in FIG. 1 through FIG. 4.

When the loosely deformed shape is formed, resistance to the direction of movement takes place because of the resilient effect of the shape formed in a different shape. Thus, smooth movement of the diaphragm is disturbed.

When the diaphragm is shaped to a truncated cone or pyramid to fit the left wall of the vessel like the above example, the diaphragm does not fit the right wall of the vessel in the same way as it does the left wall of the vessel.

These factors described here cause difference in movement of the diaphragm between the movement toward the left wall and the movement toward the right wall and further cause an error in the accumulated volume of gas measured by the gasmeter.

The effect of the shape is generally different between each piece of the diaphragm because the history during the molding is generally different between the pieces. This makes further cause of error in the measurement.

It is often observed that a diaphragm having a kind of shape effect acquires another kind of shape effect by numerous repeated movement during a prolonged period of usage. This causes an error in the measurement because the measured volume is often different from the volume at the time of approval testing.

A material which can easily follow the change in pressure, such as a single layer elastomeric sheet, may be used to avoid the effect of a molded shape. However, in this case, the diaphragm is easily extended to give a larger surface area, reproducibility of the movement of the diaphragm is decreased and the measurement of the volume of gas becomes less accurate.

SUMMARY OF THE INVENTION

The present invention accordingly has an object to provide a measuring diaphragm for gasmeter which has no shape effect on the movement of the diaphragm toward the either wall of the measuring vessel, has the same measuring volume in the movements toward the both walls of the vessel and maintains highest accuracy of measurement during a prolonged period of service.

Another object of the present invention is to provide a gasmeter comprising a measuring diaphragm having the above characteristics.

Still another object of the invention is to provide a method of preparation of a measuring diaphragm having the above characteristics.

Thus, the measuring diaphragm for gasmeter of the present invention is made of a flexible diaphragm and comprises a flat central part having at least one thin plate attached thereto and a peripheral part having an undulating structure in which grooves and ribs are parallel to the edge of the central part.

The gasmeter of the present invention has a measuring diaphragm that moves repeatedly between two side walls of a measuring vessel by stream of gas to measure volume of the passing gas by counting the accumulated number of motion of the diaphragm and is characterized in that the measuring diaphragm is made of a flexible diaphragm comprising a flat central part having at least one thin plate attached thereto and a peripheral part having an undulating structure in which grooves and ribs are parallel to the edge of the central part.

The method of preparation of the measuring diaphragm for gasmeter of the present invention is characterized in that a pair of an upper mold and a lower mold are used; that each of the molds has a flat part at the center and multiple of grooves and ribs at the periphery parallel to the edge of the central part; that the grooves and ribs on the molds are placed in such a way that the grooves of a mold fit the ribs of the other mold; that the depth of a groove on a mold is larger than the height of the rib on the other mold which fits the groove; that an elastomer composite sheet material is pressed between the molds; that a side of the elastomer composite sheet material is pressed to the surface of the ribs of the molds and fixed there with tension; that the other side of the elastomer composite sheet material faced to the surface of the grooves is not in contact with the surface of the grooves of the mold and that the elastomer composit sheet material is heated and crosslinked to form a desired shape while the material is kept between the molds.

BRIEF DESCRIPTION OF THE DRAWING

The reference characters in the figures are: A and A′: valves, B and B′: the first inlets, C and C′: measuring vessels, D and D′: the second inlets, E and E′: outlets, F and F′: measuring diaphragms, K: a connection to the utilization line, L: a cam, M: a connection to gas supply, N: a link, P: a counter, V1, V2 and V3: valves; 1: a peripheral part of a measuring diaphragm, 2: an undulating part of a measuring diaphragm, 3: a central part of a measuring diaphragm, 4 and 5: thin plates attached to a diaphragm, 11: an upper mold, 12: a lower mold, 13 and 14: ribs on molds, 15 and 16: flat surfaces on molds, 17 and 18: parts closed by the molds, 19 and 20: grooves on molds, 21 and 22: peripheral ends of molds, 23: a standard gasmeter, 24: a test gasmeter, 25: an inclined manometer, 26: a connection to gas supply, 27: opening to the atmosphere, 28: a pressure gauge, 29: a measuring device of correction for temperature difference, and 30: an inlet or an outlet of the test gasmeter.

The reference numbers in the FIGS. 12(a), 12(b) and FIG. 13 are: ① results of measurements by using instruments of the present invention, ② results of measurements by using conventional instruments.

DETAILED DESCRIPTION OF THE PREFERRED EMBODIMENTS

For the purpose of preparing a diaphragm which fits the steric shape of a vessel wall under very slight pressure and under the same pressure to both sides of the wall, as shown in FIG. 1 through FIG. 4, it was discovered that a structure having an undulating structure in the peripheral area with grooves and ribs parallel to edges can be extended with application of a slight force because of the flexibility of the accordion structure of the diaphragm. By adopting this structure, the shape of the diaphragm can be designed so that the volume of measurement is kept constant at the both ends of the movement and, at the same time, the force of movement is the same for the both direction of the movement because the overall shape of the diaphragm can be made flat. The present invention was made on the basis of this discovery.

Thus, the present invention provides a measuring diaphragm for gasmeter made of a flexible diaphragm which comprises a flat central part having at least one thin plate attached thereto and a peripheral part having an undulating structure with grooves and ribs parallel to the edge of the central part.

The present invention also provides a gasmeter having a measuring diaphragm that moves repeatedly between two side walls of the measuring vessel by a stream of gas to measure volume of the passing gas by counting the accumulated number of motion of the diaphragm, which is characterized in that the measuring diaphragm is made of a flexible diaphragm comprising a flat central part having at least one thin plate attached thereto and a peripheral part having an undulating structure with grooves and ribs parallel to the edge of the central part.

The present invention also provides a method of preparation of a measuring diaphragm for gasmeter made of a flexible diaphragm which comprises a flat central part having thin plates attached thereto and a peripheral part having an undulating structure with grooves and ribs parallel to the edge of the central part, which is characterized in that a pair of an upper mold and a lower mold are utilized; that each of the molds has a flat part at the center and multiple of grooves and ribs at the periphery parallel to the edge of the central part; that the grooves and ribs on the molds are placed in such a way that the grooves of a mold fit the ribs of the other mold; that the depth of a groove on a mold is larger than the height of the rib on the other mold which fits the groove; that an elastomer composit sheet material is pressed between the molds; that one side of the pressed elastomer composite sheet material is pressed to the surface of the ribs of the mold and fixed there with tension; that the other side of the elastomer composite sheet material faced to the surface of the grooves is not in contact with the surface of the grooves of the mold and that the elastomer composite sheet material is heated and crosslinked to form a desired shape while the material is kept between the molds.

The measuring diaphragm of the invention is favorably utilized in any kind of gasmeter in which the volume of the passing gas is measured by counting repeated movement of a measuring diaphragm equipped in a measuring vessel in the passage of the gas or of any other device connected to the diaphragm.

The measuring diaphragm utilized in the invention is a soft and flexible diaphragm made of a material which is not corroded by components of the gas to be measured. Examples of such diaphragms are elastomer composite diaphragms made of fabrics coated with elastomers, diaphragms made of flexible plastics and the like.

Examples of the elastomers utilized in the measuring diaphragm are natural rubber, butyl rubber, styrene-butadiene copolymer rubber, polybutadiene rubber, polychloroprene rubber, nitrile rubber, ethylene-propylene copolymer rubber, polyepichlorohydrin rubber, polypropylene oxide rubber and the like.

For the diaphragm of the present invention, rubber coated fabrics made by coating a rubber on thin fabrics or non-woven fabrics and sheets made by laminating a flexible plastics film, such as polyurethane film, polypropylene film, polyvinyl chloride film and the like, to rubber coated fabrics or to rubber sheets are favorably utilized.

The diaphragm comprises a central flat part and a peripheral part. The edge of the diaphragm is circular, square or polygonal having more than four sides. The shape of the section of the diaphragm cut by a plane perpendicular to the plane of the diaphragm and passing through the center of the diaphragm has an undulating structure at the peripheral part of the diaphragm. The grooves and ribs of the undulating structure are placed parallel to the edge of the diaphragm or to the edge of the central flat part. When the diaphragm is circular or elliptical, the grooves and ribs in the peripheral area are also circular or elliptical with their center at the same place as that of the diaphragm. When the diaphragm is polygonal, the grooves and ribs are also polygonal similar to the shape of the diaphragm with their edges parallel to the edge of the diaphragm.

When the outer shape of the diaphragm is not exactly similar to the shape of the central flat part, for example, when the shapes are both rectangular but differ in the ratio of the lengths of the adjacent two edges, grooves and ribs close to the edge of the diaphragm can be placed similarly to the line of the edge of the diaphragm, grooves and ribs close to the edge of the central flat part can be placed similarly to the line of the edge of the central part and the grooves and ribs in between can be placed so as to distribute the locations of the grooves and ribs makes a smooth change. This kind of design provides a smooth movement of the diaphragm.

The shape of the central flat part of the diaphragm is designed so as to fit the walls of the measuring vessel well. The shape of the outer edge of the diaphragm as a whole is designed so as to fit well to the frame of the measuring vessel which holds the diaphragm tightly. The undulating structure having grooves and ribs is placed between the edge of the central flat part and the outer edge of the diaphragm in a shape parallel to both of them.

Figures 7A, 7B:
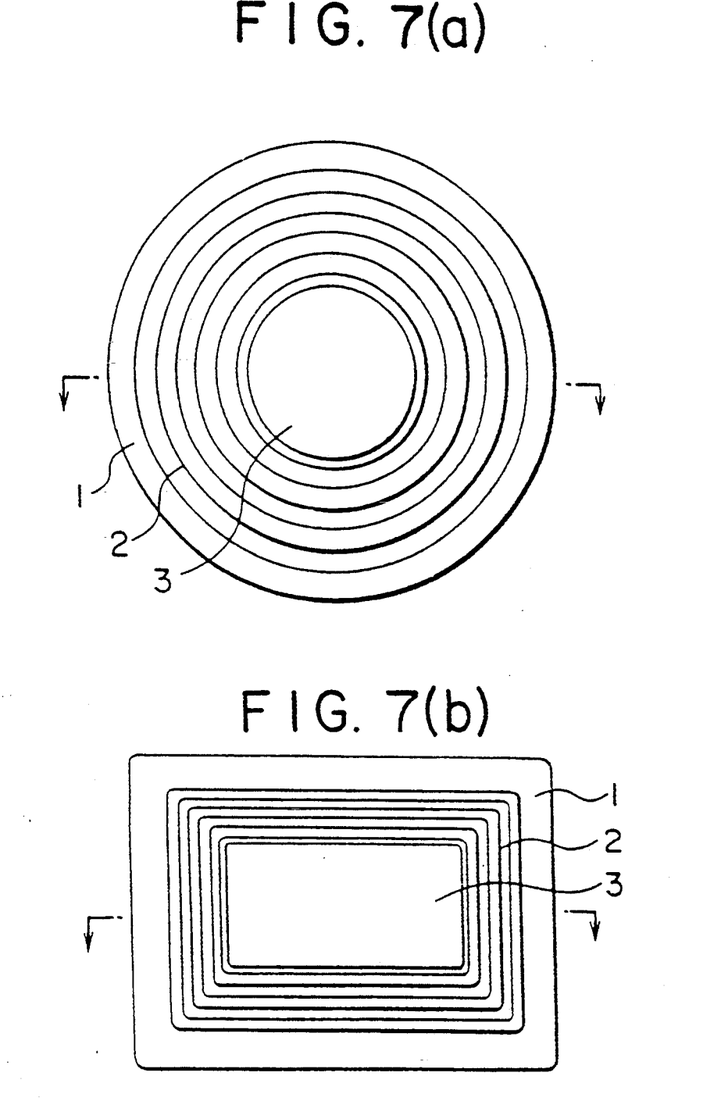
FIGS. 7(a) and 7(b) show plan views of examples of the diaphragm of the invention.

The example of the present invention shown in FIG. 7 is characterized in that the shape of the central flat part 3 has a similar shape as that of the outer edge of the diaphragm as a whole 1 and the part of the undulating structure 2 is placed between the central part 3 and the peripheral part of the diaphragm as a whole 1. The undulating part has a number of grooves and ribs of similar shapes to the shape of the edge of the central flat part and that of the outer edge of the diaphragm.

The diaphragm shown in FIG. 7(a) has a part of an undulating structure 2 which comprises a number of grooves and ribs of circular shape having the same center at the center of the diaphragm. Each of the grooves and ribs is placed at the same distance from the outer edge of the diaphragm as a whole 1. This is one of the cases when grooves and ridges are placed parallel to the edge 1.

Figure 8:
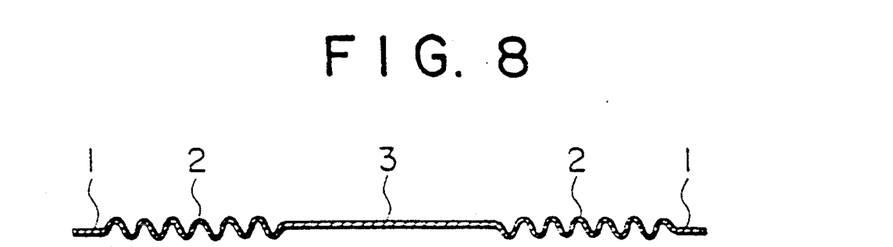
FIG. 8 shows a sectional view of the example shown in FIG. 7(a) cut by the X—X plane.

The section view of the undulating part of the diaphragm shown in FIG. 8 shows that a groove at a side is accompanied with a rib at the other side. The undulating structure, 2, shown in this figure is the source of flexibility which makes deformation of the diaphragm easy with a slight force.

The diaphragm shown in FIG. 7(b) has rectangular edges and the undulating structure 2 has a number of grooves and ridges parallel to the edge of the diaphragm.

Corners of the rectangular edges have a round shape. The round shape is designed to fit the shape of the fixing frame of the measuring vessel. It is also effective for achieving smooth movements of the diaphragm. The section view of the rectangular diaphragm shown in FIG. 8, also shows the undulating structure of the diaphragm.

The rectangular flat part 3 is placed at the center of the diaphragm. Thin plates of a metal or a plastics having the same shape or a little smaller size of the similar shape can be attached to the diaphragm. The attachment can be made by conventional methods such as fixing by bolts and nuts, application of adhesives and the like.

The undulating part may have a variety of shapes as shown in the above examples. However, it is necessary that the shape of the outer portion of the undulating part conform with the shape of the frame of the measuring vessel to which the diaphragm is fixed.

The diaphragm of the present invention may be prepared by conventional methods, for example, by placing a sheet of a material such as a rubber compound between two molds having the shape of the diaphragm to be prepared, followed by heating to crosslink the sheet. A method which leaves little or no residual strain after molding is particularly desired.

The diaphragm of the invention is prepared by using molds having a plannar shape and shows no tendency to expand to one side more easily than the other side unlike diaphragms of cones and pyramids of conventional types.

The gasmeter utilizing the diaphragm of the invention measures the volume of passing gas by counting the number of movement of the diaphragm or other devices connected to the diaphragm as shown in FIG. 1 through FIG. 4.

Figure 9A:
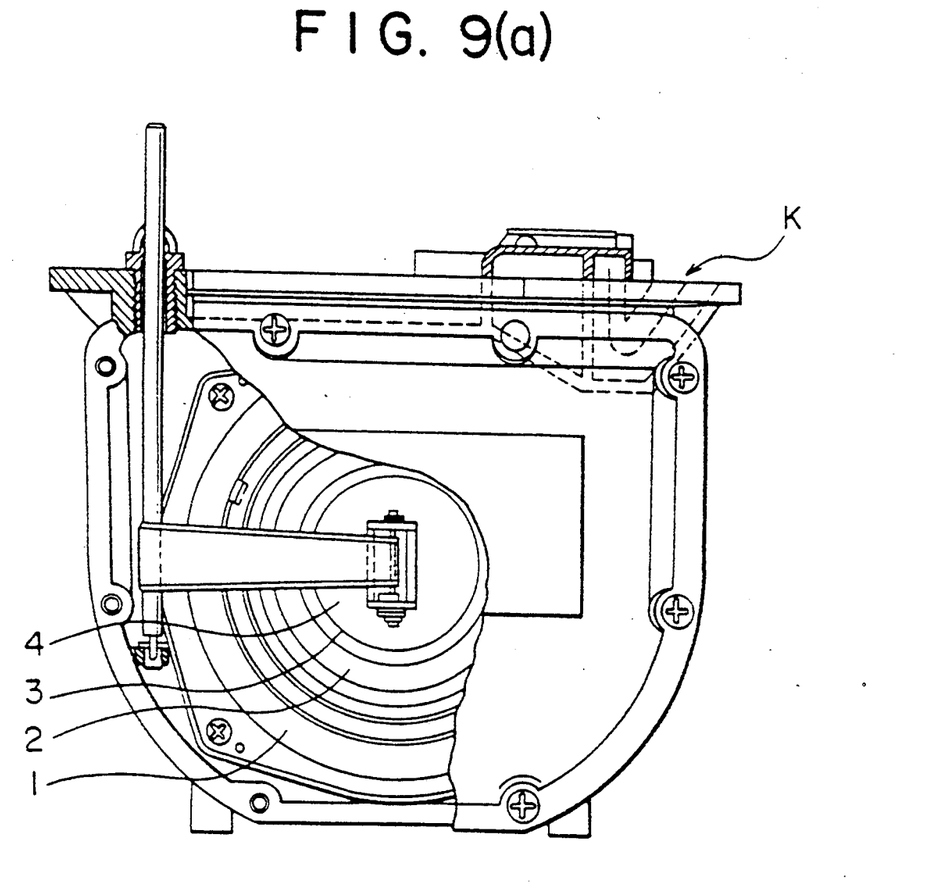
FIG. 9(a) shows a view from the bottom with partial removal of the wall of the gasmeter housing
Figure 9B:
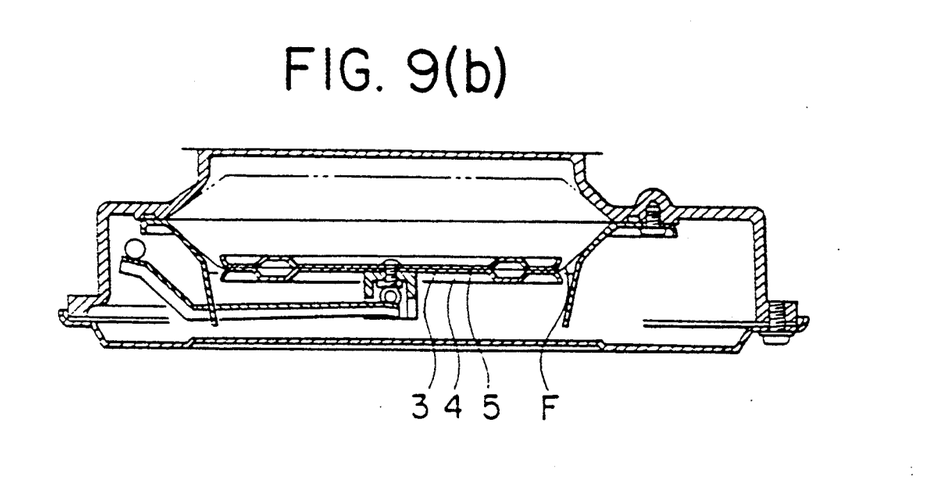
FIG. 9(b) is and a sectional view of FIG. 9(a) of the invention.

The diaphragm of the invention can be applied to conventionally available gasmeters, such as the one having the mechanism shown in FIGS. 9A and 9B without difficulty.

In the case of the gasmeter shown in the figure, gas is taken into the gasmeter through the inlet M, the measuring diaphragm is moved in the order shown in FIG. 1 through FIG. 4, the link N and the valve A are moved in connection with the diaphragm, the inlets B and D and the outlet E are opened or closed accordingly and gas is discharged through the connection, K.

The diaphragm of the invention can be applied to the gasmeter of this type and the movement of the diaphragm can be counted by using the counter P with high accuracy.

Figure 10:
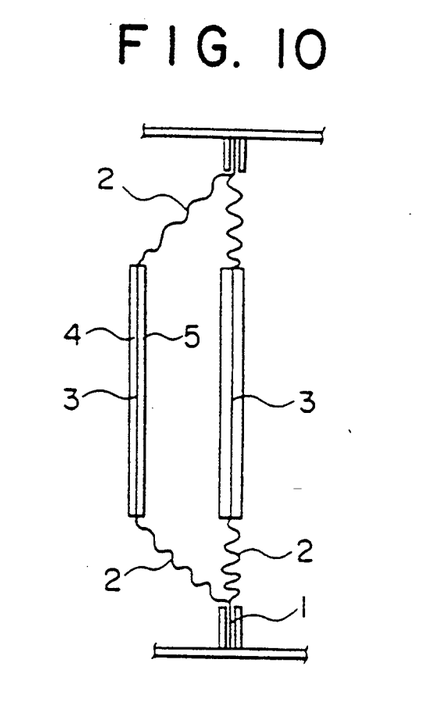
FIG. 10 shows the function of a diaphragm of the invention.

Movement of the diaphragm is shown in FIG. 10. The diaphragm does not show excess loosening deformation at the middle position between the two ends unlike diaphragms of cones and pyramids because the shape at the middle position is the original shape prepared.

When the diaphragm is in contact with the either wall, the undulating part is extended. However, the force required to extend the undulating part is very slight and makes little resistance to the movement of the diaphragm.

The diaphragm of the invention can be applied to any type of gasmeter other the one shown in FIG. 9 so long as the gasmeter measures volume of the passing gas by counting movement of a diaphragm.

Any kind of method may be utilized for the preparation of the diaphragm of the invention. However, it is particularly desirable that a method leaving little or no strain in the prepared diaphragm is utilized.

The generally practiced method to prepare this type of diaphragm having undulating structure is to press a sheet of material between a pair of molds having the exact shape and space as the diaphragm to be prepared when the mold are closed, followed by heating to crosslink the material. In the case of this method of preparation, the distance between the molds is the same as the thickness of the material sheet and naturally the material is pressed tightly by the molds from both directions. For example, when a sheet is pressed to form an undulating structure, a groove of a mold fit a rib of the other mold and both together press the sheet tightly from both directions.

In the process of the conventional method, the heated elastomer flows to fill small spaces between the molds even when the molds are made with high accuracy and the thickness of the material sheet is prepared uniformly with great care. Thus, it is unavoidable that a considerable degree of residual strain is found in the prepared diaphragm.

To avoid the formation of the residual strain, the accuracy of the thickness of the material sheet and the accuracy of the dimension of molds have been made as high as possible. And, also, placement of the material sheet between the molds has been practiced with extreme caution. However, preparation of a measuring diaphragm having the same thickness throughout the diaphragm is difficult and takes a great pain in preparing the molds and placing the sheet material between the molds.

It was discovered that, for the purpose of preparing a diaphragm which is flexible at deformation and yet has no residual strain, and also for the purpose of further increasing the accuracy of measurement by a gasmeter utilizing the diaphragm of the invention, less fixing of the material sheet between the molds during the crosslinking produces more homogeneous diaphragm. Thus, the method of preparation of the measuring diaphragm of the invention was completed on the basis of this discovery.

Figure 11:
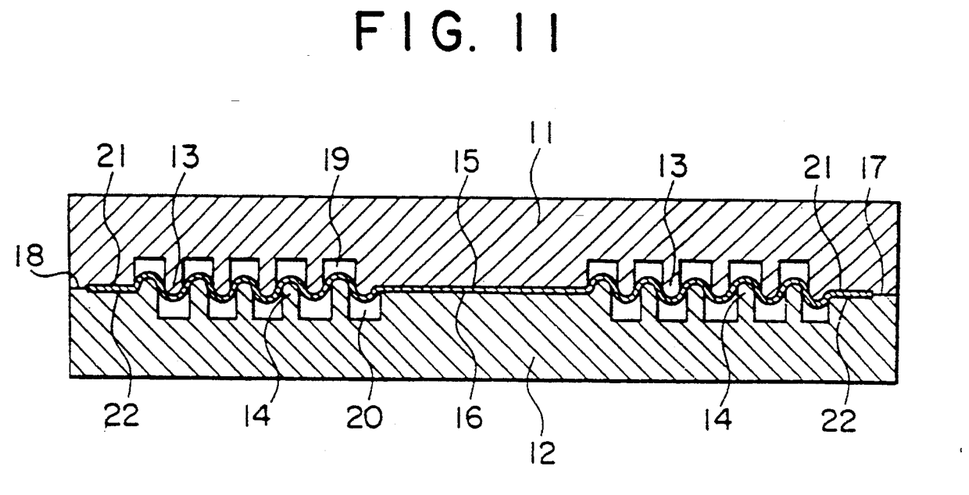
FIG. 11 shows a sectional view of the molds utilized for the preparation of a measuring diaphragm of the invention.

According to the method of preparation of the invention, the molds having a section view shown in FIG. 11, for example, is used and the material sheet is pressed between them to prepare diaphragms shown in FIG. 7(a) and FIG. 7(b).

The molds comprise an upper mold and a lower mold. The upper mold comprises a circular flat part 15 which contacts closely with the material sheet during the crosslinking process, a flat part at the outer periphery of the diaphragm 21, a number of parallel ring shape ribs 13 and grooves 19. The grooves do not contact with the sheet material during the crosslinking process.

The shape of the rings of ribs and grooves can be changed to other shapes and adjusted to the shape of the measuring diaphragm. It may be made rectangular or polygonal depending on the shape of the membrane.

The lower mold 12 which faces to the upper mold 10 comprises a circular flat part 16, a flat part at the outer periphery of the diaphragm 22, a number of parallel ring shape ribs 14 each of which is placed at the position to fit each of the grooves 19 of the upper mold 11 and grooves 20 each of which is placed at the position to fit each of the ribs 13 of the upper mold 11.

The elastomer composite sheet utilized in the method of the invention is prepared by compounding conventionally utilized rubber additives, such as crosslinking agents, crosslinking co-agents, reinforcing components and the like, to rubber materials, followed by sheeting and calendering the resulting rubber compound to a fabric.

When the material sheet is placed between the upper and lower molds and the molds are closed, the material sheet is tightly pressed between the flat parts of the molds at the central part and at the peripheral end part.

However, in the undulating part between the flat parts, the material sheet is not in contact with the surface of grooves 19 and 20 though it is in contact with the surface of the ribs 13 and 14. Because of this condition of contact of the material sheet with the surface of the molds, the material sheet is not tightly fixed between the mold surfaces during the large drawing by ribs and grooves. During the molding, tension is applied to a surface of the material sheet and the other surface is left exposed to the cavity in the grooves. When the material sheet is heated under pressure, the fabric used in the material sheet which has the heat shrinking property is deformed to the shape of the profile formed by ribs and grooves of the molds and, at the same time, the rubber layer laminated to the both sides of the material sheet is crosslinked, thus finally the product being firmly formed to the desired shape.

The above described method may be compared to a method wherein the material sheet is heated under pressure by utilizing molds having a similar undulating shape while it is tightly fixed in the space between the molds. In this case, the actual pressure applied to the material sheet by the pair of molds is not uniform. This situation causes flow of the rubber material to the parts having lower pressure and tension to the fabric to the direction of the flow. Because heat and pressure applied to the material sheet fix the structure of the sheet to the strained condition by crosslinking, the resulting molded diaphragm lacks in uniformity of thickness and strength of the product. Even when the fitting accuracy of the molds is controlled to the level of 1000ths and both of the thickness of the rubber layer and the thickness of the total sheet material are controlled to the level of 100ths, the phenomenon herein described inevitably takes place.

According to the method of the invention, tension is applied to the material sheet from only one side of the sheet by the action of the ribs of molds projecting into the cavities formed by the grooves of the mating molds. When the material sheet is heated to crosslink in this condition, the uniform thickness and the uniform stress distribution are realized in the undulating part of the diaphragm thus prepared. Because the undulating part comprises ribs and grooves which are flexing points during the inversion of the movement of the diaphragm, the advantage of the method of the invention is naturally exhibited.

The present invention is explained in more detail by the following example:

EXAMPLE

A cement of a rubber compound in which acrylonitrile-butadiene rubber and epichlorohydrin rubber, as main components, fillers and other ingredients were dissolved in methyl ethyl ketone as solvent was applied to the both sides of a 100 denir polyester plain fabric and a rubber compound the same as the above was calendered on the both sides of the treated fabric. The coated sheet was heated and crosslinked to prepare a material sheet for a diaphragm having a thickness of 0.34 mm.

The material sheet thus prepared was cut to a circular shape of 110 mm diameter and placed between a pair of molds of diameter of 100 mm shown in FIG. 11 by cramping periphery of the sheet in such a manner as to make the distribution of the material as uniform as possible. The molds were tightly closed and heated for 20 minutes after the mold temperature reached 160° C. Thus, a measuring diaphragm for a gasmeter was prepared.

Plastics thin plates having a fitting shape and size were attached to the central flat part of the diaphragm and fixed by a bolt and nut at the center. The measuring diaphragm thus prepared was fixed to to a gasmeter shown in FIG. 9.

The results of tests of the gasmeter are shown in the following:

(1) Test of Instrumental Error

The instrumental error means error in the measurement by a test instrument from the true value of the measurement, which is expressed by the following formula:

$$\frac{\text{Value observed by a test instrument} - \text{True value}}{\text{Value observed by a test instrument}} \times 100(\%)$$

General causes of the instrumental error are change of size of the diaphragm, mechanical resistance for the movement, leak from valves and valve sheets and the like.

Figure 14:
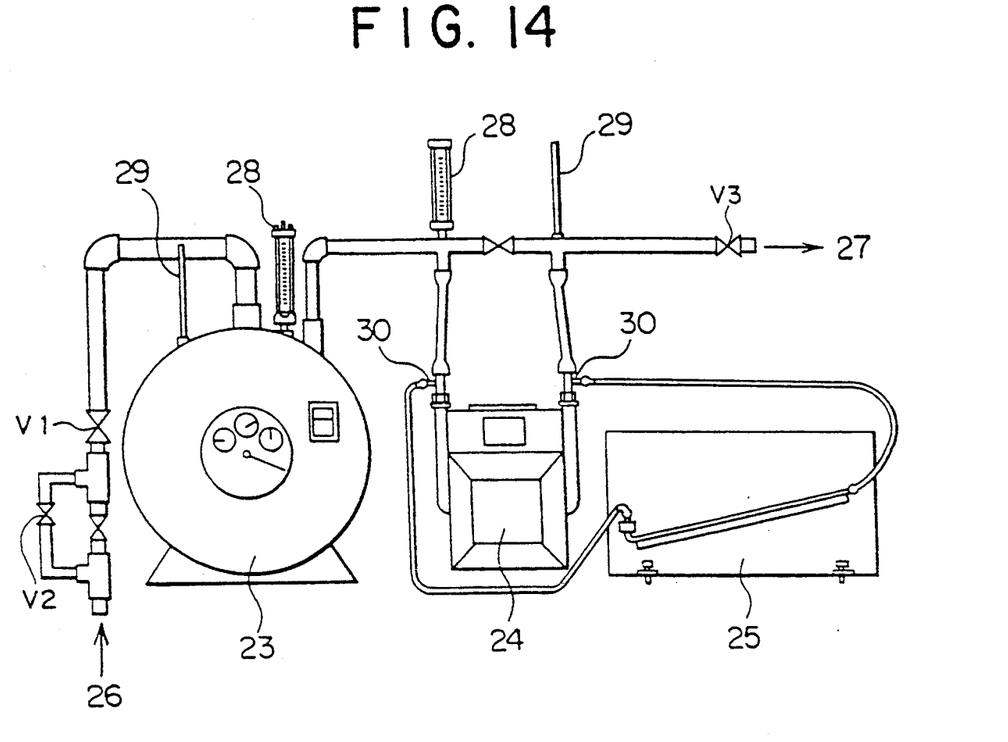
FIG. 14 shows a measuring system for the test of instrumental error and pressure loss. The system comprises a standard instrument, test instruments, measuring devices, connecting tubes and other parts.

Conditions for the test were:
  Place of the test: a chamber controlled at a desired temperature and humidity.
  Gas utilized: air of an ambient temperature and pressure.
  Apparatus for the test: a system of instruments as shown in FIG. 14.
  Standard gasmeter: a wet type gasmeter having the structure in accordance with the Japanese official standard and approved by the official test.
  Method of the test: (A) The valve V3 was fully open and the valves V1 and V2 were adjusted so as to make the flow rate of the gas 6 cubic meter per hour; (B) Values shown in the test instrument and the standard instrument were recorded; (C) Temperature and pressure of the passing air in both of the test instrument and the standard instrument were recorded; (D) After a specified volume of gas had passed through the instruments, values shown in the test instrument and the standard instrument were recorded; (E) The air utilized for the test was passed through a tank before the test and adjusted to the test temperature; and (F) The test instrument was placed in the test chamber before the test and adjusted to the test temperature.

The instrumental error was calculated according to the following equation:

$$E=((I-Q)I)\times 100+Es+(t_I-t_Q)+(P_Q-P_I)$$

where
- Es: instrumental error of the standard gasmeter (%)
- E: instrumental error of the test gasmeter (%)
- Q: value observed by the standard gasmeter (l)
- I: value observed by the test gas meter (l)
- $t_Q$: observed value of correction for temperature difference of the standard gasmeter (%)
- $t_I$: observed value of correction for temperature difference of the test gasmeter (%)
- $P_Q$: relative pressure of the standard gasmeter calculated from the observed value (mm H₂O) by setting 10 mm H₂O as 0.1% (%)
- $P_I$: relative pressure of the test gasmeter calculated from the observed value (mm H₂O) by setting 10 mm H₂O as 0.1% (%)

Test gasmeters which were equipped with diaphragms of the present invention and other test gasmeters which were equipped with diaphragms of a conventional structure were installed in the test apparatus shown in FIG. 14 and the instrumental error and the pressure loss were evaluated. Three test gasmeters equipped with the diaphragms of the invention and two gasmeters equipped with the conventional diaphragms, five gasmeters in all, were all connected series and served for the test even though only one instrument each are shown in FIG. 14.

Figure 12A:
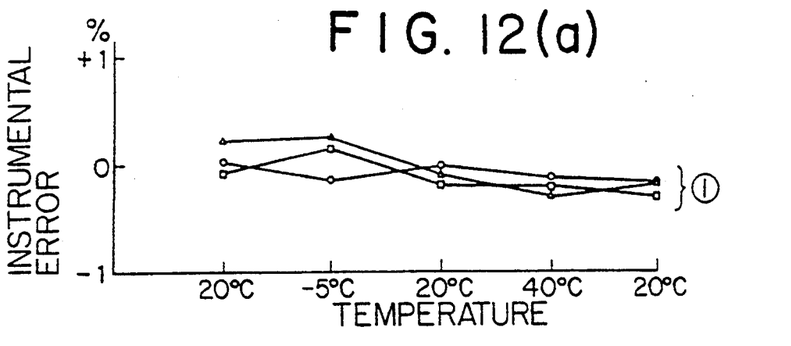
FIG. 12(a) shows the instrumental error of measurement when the measurements were made by two or three instruments of the present invention. The FIG. 12(b) shows the difference in the instrumental error when the measurements were made by instruments of the prior art.
Figure 12B:
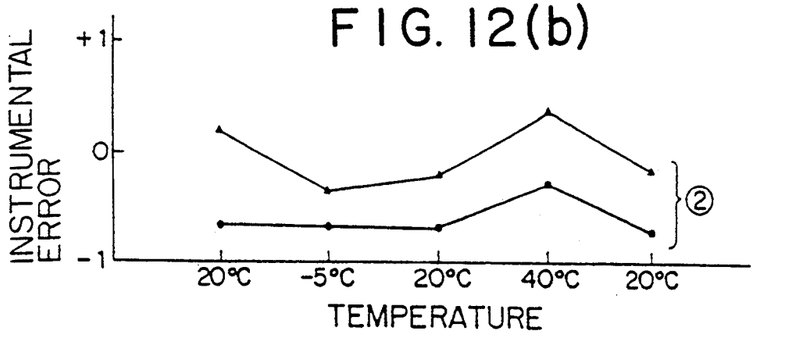

FIG. 12 shows the results of the instrumental error test. The instrumental error values shown by ①️ in the figure were obtained by the instruments equipped with a pair of the conventional diaphragm and the values shown by ②️ were obtained by the instruments equipped with a pair of the diaphragm of the invention. The values in FIG. 12 are shown as relative values expressed in percent based on the observed value by the standard gasmeter which was set as zero. For example, a value of +0.3 or −0.2 means that the observed value of the volume of the passing gas was larger than or smaller than the value of the standard gasmeter by 0.3% or 0.2%, respectively. The instrumental error values shown in FIG. 12 for the gasmeter equipped with the conventional diaphragm are in the range from +0.4 to −0.7 while the corresponding values for the gasmeter equipped with the diaphragm of the invention are in the range from +0.3 to −0.2. It is clearly shown that the gasmeter equipped with the diaphragm of the invention has much smaller instrumental error.

(2) Test of Pressure Loss

The pressure loss means difference of the pressure at the inlet and at the outlet and is loss of pressure caused by operation of a gasmeter. Test conditions, gas, apparatus and the standard gasmeter utilized for the test are the same as the ones described in the test of the instrumental error. Method of the test is as following:

Five or more of test gasmeters were connected to the standard gasmeter in the apparatus shown in FIG. 14. Outlets for pressure measurement 30 were made at positions closest to the outlet and the inlet of each test gasmeter 24 and an inclined manometer 25 was connected to the outlets for pressure measurement 30 through rubber tubes. Then, gas was passed through the apparatus. Flow rate of gas was increased until it reached the maximum value at which the volume of gas can be measured with an accuracy of the official specification. The pressure difference at the inlet and at the outlet was recorded at this limit condition.

Figure 15:
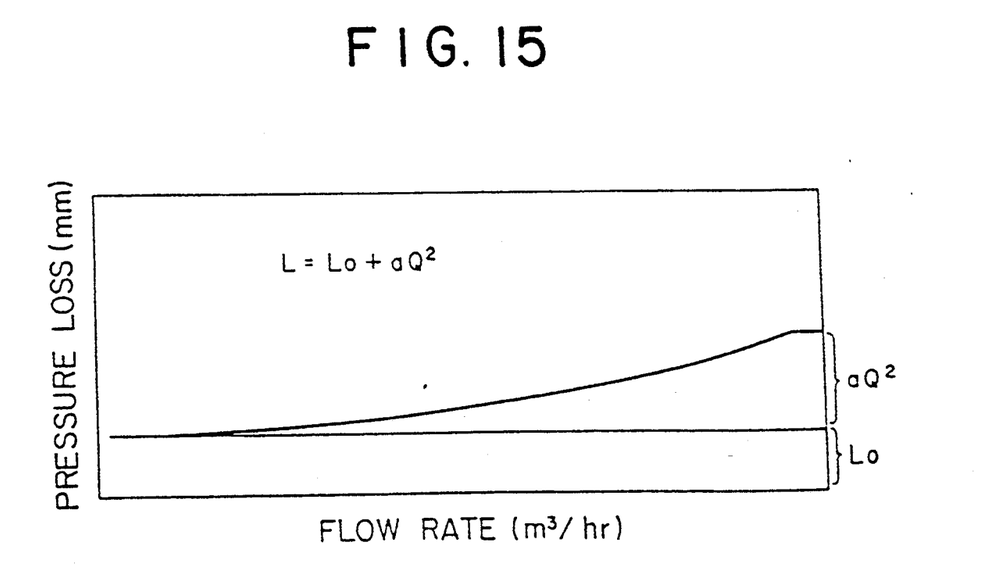
FIG. 15 shows a general relationship between flow rate and pressure loss.

General shape of the pressure loss curve is shown in FIG. 15. In general, the pressure loss is expressed by the following equation:

$$L=L_0+aQ^2$$

where $L_0$ and $a$ are constants determined by the structure of gasmeter, kind of gas and temperature. Pressure loss of a fluid in a passage is approximately proportional to square of flow rate. Thus, $L_0$ in the above equation is the mechanical resistance by the connected structure of the apparatus, $aQ^2$ is pressure loss of the fluid in the passage and $L_0$ is a constant independent of the flow rate. The measurement of pressure loss was made by using the same installation of five test gasmeters as in the measurement of the instrumental error. The maximum flow rate was 6 cubic meter per hour and test temperatures were −5° C., +20° C. and +40° C.

Figure 13:
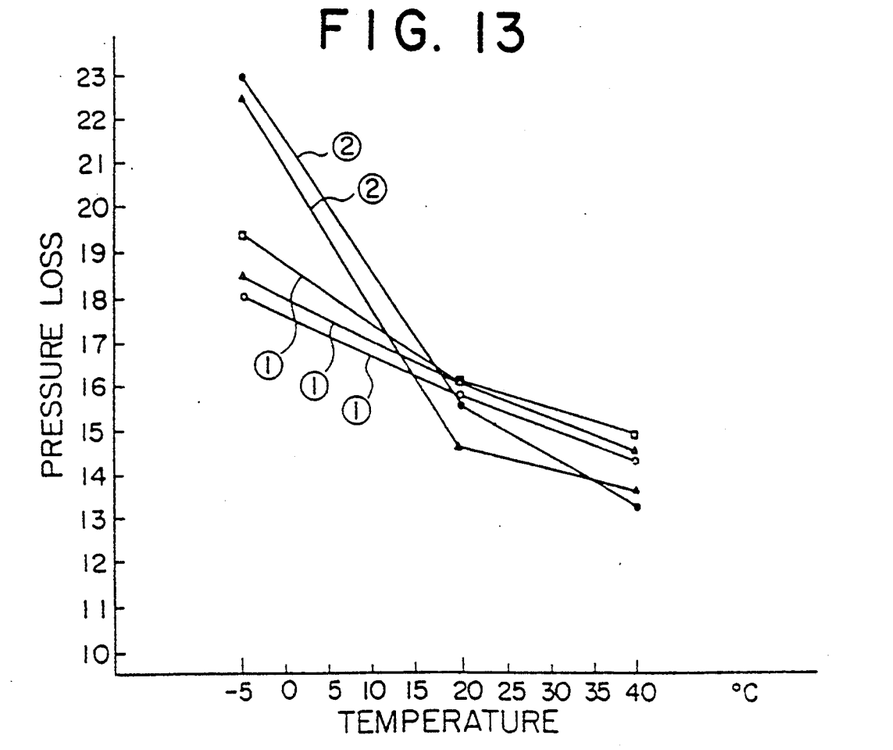
FIG. 13 shows difference in the pressure loss when the measurements were made by an instrument of the invention and by a conventional instrument.

Results of the measurement are shown in FIG. 13. The conventional gasmeter had pressure loss of about 23 mm H₂O at −5° C. and 13.3 mm H₂O at +40° C. and the pressure loss is different as much as 40% by the difference of temperature of atmosphere. This shows that the pressure to the diaphragm is not uniform and the diaphragm is expanded during the prolonged period of utilization. Thus, the volume of the measuring vessel is changed and the result of measurement is inevitably accompanied with greater error.

To summarize the advantage obtained by the present invention, the gasmeter equipped with the diaphragm of the present invention has much smaller instrumental error, such as in the range from +0.3 to −0.2 as shown in the tests in the example while the gasmeter equipped with a conventional diaphragm has larger instrumental error, such as in the range from +0.4 to −0.7. The gasmeter of the invention is not much affected by temperature of atmosphere or change of temperature and gives a stable value of measurement in various conditions.

The gasmeter equipped with the diaphragm of the present invention has much smaller change of pressure loss by temperature. In the tests in the example, the pressure loss at −5° C. and at +40° C. was about 19.4 mm H₂O and 15 mm H₂O, respectively, and the change of the pressure loss by temperature was about 27%. On the other hand, the gasmeter equipped with the conventional diaphragm showed the change of pressure loss by the same temperature change was about 40%.

The particularly important advantage of the gasmeter of the present invention is that the gasmeter has much smaller pressure loss at lower temperature. In the tests in the example, the two gasmeters equipped with the conventional diaphragm had pressure loss of 22.5 mm H₂O and 23.0 mm H₂O at −5° C. On the other hand, the gasmeter of the invention had pressure loss lower than the conventional gasmeters by about 13%. Because the stress applied to the diaphragm of the invention is much smaller at lower temperature, undesirable deformation of the diaphragm is avoided. Thus, the gasmeter of the present invention is particularly advantageous in the utilization at areas of lower temperature.

While the invention has been particularly shown and described with reference to preferred embodiments thereof, it will be understood by those skilled in the art that the foregoing and other changes in form and details can be made therein without departing from the spirit and scope of the invention.

What is claimed is:

1. In a method for manufacturing a flexible unitary measuring diaphragm to have little or no residual strain therein, for use in gasmeters, the steps comprising:

providing a first mold and a second mold to form said diaphragm;

forming each of said molds to have:
a central portion, said central portion of each mold having a predetermined shaped edge portion, a flat center, a length and a width; and
a plurality of alternating grooves and ribs surrounding said central portion of each mold, said grooves and ribs being formed to be parallel to the predetermined shaped edge portion of the central portion of each mold;
a smaller one of the length and the width of said central portion of each mold having a first dimension when measured along a straight line extending through the center of the central portion of each mold to a point on said edge portion of said central portion of each mold, that is a multiple, greater than one, of a second dimension that is a dimension of one of the ribs and a groove adjoining the one rib as measured along said straight line when said straight line is extended to a respective edge of each of said molds; and arranging the grooves and ribs on the molds so that respective ribs of each mold fit into respective corresponding grooves of the other mold when the molds are pressed together in an operational position;

adjusting a depth of the grooves on each of the molds so that a bottom portion of each groove is separated by a given space from the rib fitting thereinto when said molds are in said operational position;

positioning between said molds without tightly fixing to said molds, an elastomer composite sheet material having a first and a second surface;

pressing the molds together with the not tightly fixed elastomer composite sheet material therebetween, so that the elastomer composite sheet material is pressed on both said first and second surfaces thereof and is held by said central portions of each of the molds and fits over and adheres by tension to a surface of each of the ribs of the molds while being spaced apart from the bottom portion of each of the grooves, by a second space smaller than said given space;

the elastomer composite sheet material being drawn by each of said ribs of said molds at not tightly fixed portions of said elastomer composite sheet as said molds are pressed together to be in said operational position;

the respective second spaces separating bottom walls of each of the grooves from the stretched elastomer composite sheet material which contacts a respective facing rib, thereby providing a uniform stress distribution in the first and second surfaces of the drawn elastomer composite sheet material;

said molds providing a central portion in said elastomer composite sheet material which is pressed on both said first and second surfaces thereof by the molds; and then heating the drawn elastomer composite sheet material to crosslink said material while the drawn elastomer composite sheet material adheres to the ribs of the molds, thereby to form said measuring diaphragm having little or no residual strain therein with said central portion surrounded by alternating ribs and grooves.

2. The method according to claim 1, comprising:
forming the plurality of grooves and ribs surrounding said central portion of said molds with continuous half circularity.

3. The method according to claim 1, wherein the elastomer composite sheet material is heat shrinkable, the heating step comprises heat shrinking said elastomer composite sheet material.

4. The method according to claim 1, further comprising the additional steps of:
providing an outer edge portion on each of said molds which surrounds the plurality of alternating grooves and ribs, said outer edge portion of each mold having substantially the same shape and being substantially parallel to the edge portion of said central portion of each mold.

5. The method according to claim 1, comprising the additional steps of:
removing the diaphragm from the molds after the heating step; and
mounting the thus formed diaphragm in a frame.

6. The method according to claim 1, wherein the step of positioning said elastomer composite sheet material comprises positioning a lamination of a flexible plastics film and a rubber coated fabric between said molds.

7. The method according to claim 1, wherein the step of positioning said elastomer composite sheet material comprises positioning a fabric coated with an elastomer between said molds.

8. The method according to claim 6, wherein the lamination comprises said flexible plastics film laminated to an epichlorhydrin rubber and a hundred denier plain fabric.

9. The method according to claim 1, wherein the step of positioning said elastomer composite sheet material comprises positioning a lamination of a flexible plastics film, an epichlorhydrin rubber and a hundred denier plain fabric between said molds.

10. The method according to claim 1, wherein the step of positioning the elastomer composite sheet material comprises positioning a sheet material comprising an epichlorhydrin rubber and a hundred denier plain fabric between said molds.

11. In a method for manufacturing a flexible unitary measuring diaphragm to have little or no residual strain, for use in gasmeters, the steps comprising:

providing a first mold and a second mold to form said diaphragm;

forming each of said molds to have:
a central portion, said central portion of each mold having a predetermined shaped edge portion, a flat center, a length and a width; and
a plurality of alternating grooves and ribs surrounding said central portion of each mold, said grooves and ribs being formed to be parallel to the predetermined shaped edge portion of the central portion of each mold;
a smaller one of the length and the width of said central portion of each mold having a first dimension when measured along a straight line extending through the center of the central portion of each mold to a point on said edge portion of said central portion of each mold, that is a multiple, greater than one, of a second dimension that is a dimension of one of the ribs and a groove adjoining the one rib as measured along said straight line when said straight line is extended to a respective edge of each of said molds; and arranging the grooves and ribs on the molds so that respective ribs of each mold fit into respective corresponding grooves of the other mold when the molds are pressed together in an operational position;

adjusting a depth of the grooves on each of the molds so that a bottom portion of each groove is separated by a given space from the rib fitting thereinto when said molds are in said operational position;

positioning between said molds without tightly fixing to said molds, an elastomer composite sheet material having a first and a second surface;

said elastomer composite sheet material being formed by laminating a flexible plastic film to a rubber coated fabric;

pressing the molds together with the not tightly fixed elastomer composite sheet material therebetween, so that the elastomer composite sheet material is pressed on both said first and second surfaces thereof and is held by said central portions of each of the molds and fits over and adheres by tension to a surface of each of the ribs of the molds while being spaced apart from the bottom portion of each of the grooves, by a second space smaller than said given space;

the elastomer composite sheet material being drawn by each of said ribs of said molds at not tightly fixed portion of the elastomer composite sheet as said molds are pressed together to be in said operational position;

the respective second spaces separating bottom walls of each of the grooves from the drawn elastomer composite sheet material which contacts a respective facing rib, thereby providing a uniform stress distribution in the first and second surfaces of the drawn elastomer composite sheet material;

said molds providing the central portion in said elastomer composite sheet material which is pressed on both said first and second surfaces thereof by the molds; and then heating the drawn elastomer composite sheet material to crosslink said material while the drawn elastomer composite sheet material adheres to the ribs of the molds, thereby to form said measuring diaphragm having little or no residual strain therein with said central portion surrounded by alternating ribs and grooves.

12. The method according to claim 11, wherein the elastomer composite sheet material comprises an epichlorhydrin rubber and a hundred denier plain fabric.

13. The method according to claim 11, wherein the elastomer composite sheet material is heat shrinkable, the heating step comprises heat shrinking said elastomer composite sheet material.

14. The method according to claim 11, further comprising the additional steps of:

providing an outer edge portion on each of said molds which surrounds the plurality of alternating grooves and ribs, said outer edge portion of each mold having substantially the same shape and being substantially parallel to the edge portion of said central portion of each mold.

15. The method according to claim 11, comprising the additional steps of:

removing the diaphragm from the molds after the heating step; and mounting the thus formed diaphragm in a frame.

16. In a method for manufacturing a flexible unitary measuring diaphragm to have little or no residual strain, for use in gasmeters, the steps comprising:

providing a first mold and a second mold to form said diaphragm;

forming each of said molds to have:

a central portion, said central portion of each mold having a predetermined shaped edge portion, a flat center, a length and a width; and a plurality of alternating grooves and ribs surrounding said central portion of each mold, said grooves and ribs being formed to be parallel to the predetermined shaped edge portion of the central portion of each mold;

a smaller one of the length and the width of said central portion of each mold having a first dimension when measured along a straight line extending through the center of the central portion of each mold to a point on said edge portion of said central portion of each mold, that is a multiple, greater than one, of a second dimension that is a dimension of one of the ribs and a groove adjoining the one rib as measured along said straight line when said straight line is extended to a respective edge of each of said molds; and arranging the grooves and ribs on the molds so that respective ribs of each mold fit into respective corresponding grooves of the other mold when the molds are pressed together in an operational position;

adjusting a depth of the grooves on each of the molds so that a bottom portion of each groove is separated by a given space from the rib fitting thereinto when said molds are in said operational position;

positioning between said molds without tightly fixing to said molds, an elastomer composite sheet material having a first and a second surface;

said elastomer composite sheet material being formed by coating a fabric with an elastomer;

pressing the molds together with the not tightly fixed elastomer composite sheet material therebetween, so that the elastomer composite sheet material is pressed on both the first and second surfaces thereof and is held by said central portions of each of the molds and fits over and adheres by tension to a surface of each of the ribs of the molds while being spaced apart from the bottom portion of each of the grooves, by a second space smaller than said given space;

the elastomer composite sheet material being drawn by each of said ribs of said molds at not tightly portion of the elastomer composite sheet as said molds are pressed together to be in said operational position;

the respective second spaces separating bottom walls of each of the grooves from the drawn elastomer composite sheet material which contacts a respective facing rib, thereby providing a uniform stress distribution in the first and second surfaces of the drawn elastomer composite sheet material;

said molds providing a central portion in said drawn elastomer composite sheet material which is pressed on both said first and second surfaces thereof by the molds; and then heating the drawn elastomer composite sheet material to crosslink said material while the drawn elastomer composite sheet material adheres to the ribs of the molds, thereby to form said measuring diaphragm having little or no residual strain therein with said central portion surrounded by alternating ribs and grooves.

17. The method according to claim 16, wherein the elastomer composite sheet material comprises an epichlorhydrin rubber and a hundred denier plain fabric.

18. The method according to claim 16, wherein the elastomer composite sheet material is heat shrinkable, the heating step comprises heat shrinking said elastomer composite sheet material.

19. The method according to claim 16, further comprising the additional steps of:

providing an outer edge portion on each of said molds which surrounds the plurality of alternating grooves and ribs, said outer edge portion of each mold having substantially the same shape and being substantially parallel to the edge portion of said central portion of each mold.

20. The method according to claim 16, comprising the additional steps of:

removing the diaphragm from the molds after the heating step; and mounting the thus formed diaphragm in a frame.

* * * * *